US008228950B2

(12) United States Patent
Stopler et al.

(10) Patent No.: US 8,228,950 B2
(45) Date of Patent: Jul. 24, 2012

(54) METHOD AND DEVICE FOR HANDLING RANGING SIGNALS IN A WIRELESS COMMUNICATIONS NETWORK

(75) Inventors: Dan Stopler, Holon (IL); Tal Kaitz, Kiryat-Ono (IL); Yaniv Bar, Ramat-Gan (IL)

(73) Assignee: Alvarion Ltd., Tel Aviv (IL)

( * ) Notice: Subject to any disclaimer, the term of this patent is extended or adjusted under 35 U.S.C. 154(b) by 1138 days.

(21) Appl. No.: 11/522,532

(22) Filed: Sep. 18, 2006

(65) Prior Publication Data

US 2007/0076589 A1     Apr. 5, 2007

(30) Foreign Application Priority Data

Sep. 18, 2005   (IL) .......................................... 170924

(51) Int. Cl.
*H04B 3/10*     (2006.01)
(52) U.S. Cl. ........ 370/491; 370/203; 370/281; 370/295; 370/319; 370/328; 370/344; 370/500; 455/59; 455/112; 455/216; 455/422.1; 375/260
(58) Field of Classification Search .......... 370/203–208, 370/281, 295, 319, 349, 480, 491, 500, 210, 370/300, 310.2, 328–339, 343, 344, 436, 370/478, 481; 375/260–267; 455/59, 60, 455/112, 216, 422.1
See application file for complete search history.

(56) References Cited

U.S. PATENT DOCUMENTS

| | | | |
|---|---|---|---|
| 2003/0026295 A1* | 2/2003 | Baum et al. | 370/503 |
| 2006/0018412 A1* | 1/2006 | Jung et al. | 375/341 |
| 2006/0035643 A1* | 2/2006 | Vook et al. | 455/450 |
| 2006/0098749 A1* | 5/2006 | Sung et al. | 375/260 |
| 2006/0215542 A1* | 9/2006 | Mandyam | 370/208 |
| 2007/0053473 A1* | 3/2007 | Palin | 375/355 |
| 2007/0058524 A1* | 3/2007 | Modlin et al. | 370/208 |
| 2010/0061427 A1* | 3/2010 | Lopez-Risueno et al. | 375/150 |

* cited by examiner

*Primary Examiner* — Hoon J Chung
(74) *Attorney, Agent, or Firm* — Browdy and Neimark, PLLC (57) ABSTRACT

A method for detecting and/or estimating a ranging signal in a wireless communications network, wherein the ranging signal comprises a plurality of tiles. The method includes (i) for two or more of the plurality of tiles, carrying out a plurality of mathematical correlations for one or more of the plurality of tiles but less than all of the plurality of tiles products between subcarriers, wherein at least one of the plurality of products is carried out between non-adjacent subcarriers associated with one of the two or more of the plurality of tiles; (ii) summing the results of the correlations products, thereby obtaining mathematical correlations that make up summed results; and (iii) based on the summed results, detecting a code characterizing the ranging signal and/or estimating the timing offset of the ranging signal.

17 Claims, 4 Drawing Sheets

METHOD AND DEVICE FOR HANDLING RANGING SIGNALS IN A WIRELESS COMMUNICATIONS NETWORK

FIELD OF THE INVENTION

The present invention relates to method and apparatus adapted to improve the receiving of signals in wireless communications systems, and more particularly to the improvement of the ranging process in such wireless networks.

BACKGROUND OF THE INVENTION

Ranging in certain wireless networks such as those based on OFDMA technology (e.g. WiMax) is done by generating a ranging pattern for a subset out of the available tones for the duration of 2 or more symbols. Taking WiMax as an example, the tones are divided into subsets of 4 successive tones called tiles, e.g. Tile1=tones 1 to 4, Tile2=tones 5 to 8, Tile3=tones 9 to 12, and so on. Out of all the tiles, a subset of tiles is selected for deriving a ranging code as demonstrated in FIG. 1. This subset is referred to as a ranging subchannel. The tiles belonging to such a ranging subchannel are typically spread over the entire frequency band, but with pseudo random inter-tile frequency gaps. For example, for a system using 1024 tones FFT, there are 36 tiles per ranging code, with the average gap between each two consecutive tiles of these 36 tiles is 6 tiles.

Let us assume that $\underline{x} = \{x_1, x_2, \ldots, x_N\}^T$ denotes a ranging code vector transmitted over an OFDM multi tone channel, where N is the number of tones and code symbol $x_k$ is transmitted at the tone k. For tones that are not used in the ranging code, we set $x_k = 0$. Let now $\tau$ be the timing offset of the transmitter, and $\Delta_w$—the tones' frequency spacing in [rad/sec]. The purpose of the ranging process is to discover whether a transmitter is transmitting a ranging code, and if so, estimate its timing offset ("range") $\tau$. Detection and timing estimation are based on the received signal $r_k$:

$$r_k = c_k x_k \cdot e^{j \cdot k \Delta_w \cdot \tau} v_k \quad 1 \leq k \leq N \quad (1)$$

where
$c_k$ is the complex channel response for tone k; and
$v_k$ is the additive noise for tone k.

Moreover, a typical ranging protocol allows several ranging codes to be transmitted at the same time on the same tiles, as long as each of the ranging codes is different from the others, and provided that there are not too many ranging codes all together so that their SINR (Signal to Interference and Noise Ratio) is sufficient. A suitable receiver should be able to separately detect them and also time their arrival. The separation of overlapping code is based on a CDMA like principle:

After correlating $\{r_k\}$—the received vector—with $\underline{x} = \{x_1, x_2, \ldots, x_N\}^T$—the ranging code, the other interfering codes would appear as Additive White Gaussian Noise (hereinafter "AWGN") at the correlator output.

For better clarification, let us assume that the additive noise $v_k$ is an Independent Identically Distributed (I.I.D.) Gaussian random variable having zero mean and variance equal to $N_0$. The additive noise25 $v_k$ accounts for interference as well as for noise, as long as the interfering code is different than the desired code. Next, we assume that the channels are of the Rayleigh type. Now, let $\underline{c} = \{c_1, c_2, \ldots, c_N\}^T$ define the vector channel and assume that $\underline{c}$ is a Gaussian random vector with zero mean and autocorrelation matrix $\underline{R}_c$.

By defining $$\underline{X} = \text{diag}([x_1 e^{-j \cdot 0 \Delta_w \cdot \tau}, x_2 e^{-j \cdot 1 \Delta_w \cdot \tau} \ldots x_k e^{-j \cdot (k-1)\Delta_w \cdot \tau} \ldots x_N e^{-j \cdot (N-1)\Delta_w \cdot \tau}]),$$

equation (1) can be re-written as $$\underline{r} = \underline{X}\underline{c} + \underline{v} \quad (2)$$

where $\underline{r} = \{r_1, r_2, \ldots, r_M\}^T$ and $\underline{v} = \{v_1, v_2, \ldots, v_M\}^T$ A typical ranging requirement is for the receiver to use $\underline{r}$ to detect one of the known transmitted codes x and its corresponding timing offset $\tau$ over a channel having a prescribed false alarm rate $P_{FAR}$ and minimal mis-detection probability. The receiver may use reception on one or more antennas for this purpose.

SUMMARY OF THE INVENTION

It is an object of the present invention to provide a method and apparatus that allow improving the performance of reception in wireless network, and particularly to improve the ranging process, such as when new subscribers join the network, etc.

It is another object of the present invention to provide a method and device that are adapted to reduce the complexity involved in using conventional methods for carrying out the calculations required while receiving wireless transmissions.

It is yet another object of the present invention to provide a method and device enabling a multiple antenna receiver to carry out simultaneous phasing in time the domain and in the space domain.

It is still another object of the present invention to provide a novel multiple reception antenna base station.

Other objects of the invention will become apparent as the description of the invention proceeds.

In accordance with a first aspect of the present invention, there is provided in a wireless communications network a method for detecting and/or estimating a ranging signal transmitted to a base station of that wireless communications network. As was previously explained, such ranging signal is constructed of a plurality of time-frequency tiles (referred to hereinafter as "tiles") spread over the frequency bandwidth, where each such tile comprises a number of tones.

The method according to a first embodiment of the present invention comprising the steps of:
(i) for one or more of the plurality of tiles but less than all of the plurality of tiles, carrying out a plurality of mathematical correlations;
(ii) summing the results of the correlations; and
(iii) based on the summed results, detecting a code characterizing the ranging signal and/or estimating the timing offset of that ranging signal.

Preferably, each of the correlations is conducted on one of these tiles with a pre-determined number of its adjacent neighboring tiles in the frequency domain, but on less than all of the tiles comprising the ranging signal. The pre-defined number of neighboring tiles could preferably be 1 to 3 neighbors.

In addition, or in the alternative, a value for maximum allowable frequency offset is determined, and for each of the tiles the correlations are conducted with as many neighbors as there are within that frequency offset. Next, the plurality of the resulting correlations thus obtained, are summed and the delay associated with the ranging signal is evaluated in order to enable estimating the timing offset. This sum of correlations is then preferably correlated with exponents (delay hypothesis), or in the alternative a coarse IFFT is used to estimate the actual timing offset.

As will be appreciated by those skilled in the art, the use of short autocorrelation obtained as explained above, smoothes the timing information which is required to handle actual channels having none-zero delay spread.

According to another embodiment of the invention, the correlations carried out on each one of these tiles are then multiplied (in the frequency domain) by a proper window (preferably characterized by a power delay profile), prior to calculating the correlation with time hypothesis exponents. In addition, this process may further be repeated with several windows (e.g. different power delay profiles that are appropriate for vehicular vs indoor stations) in order to obtain the best estimate for the ranging signal. A detector is then used to operate at one or more windows that are optimized to a specific power delay profile (e.g. starting at high value and decaying with time), in order to determine the ranging signal. Such autocorrelation-based ranging method was found to improve timing performance by a factor of at least 6 with respect to tile-based methods, and by a factor of at least 3 with respect to non-smoothed time domain methods.

According to still another embodiment of the invention, the method is adapted for use with an array of antennas. Let us consider for example a case of an array comprising two antennas (II+II calibrated array can be handled similarly). According to this embodiment of the invention, an autocorrelation is calculated for each the antennas separately, and a time cross-correlation is calculated between these two antennas. The use of the three correlations thus obtained, allows to combine both the time domain and the space domain phasing (e.g. looking at a specific direction with a specific timing delay), which in return allows carrying out a ranging process by coherently combining the results obtained for the two antennas associated with the process, rather than combining them in a non-coherent fashion. Consequently, an improved performance is achieved.

According to still another embodiment of the invention, in order to allow further reduction in the complexity of the calculation, the method provided by the present invention is used in a multi stage fashion. At first, shorter auto correlations (without taking the tiles' neighbors into account) are calculated and used to discard weak hypothesis. Then the remaining ones are augmenting to longer autocorrelations (or antenna cross correlation) to allow handling the stronger hypothesis with higher degree of precision.

By yet another aspect of the present invention there is provided a receiver adapted to operate in a wireless communications network and comprising:

an interface operative to allow receiving wireless transmission comprising a ranging signal that comprises a plurality of tiles from at least one wireless transmitter;

at least one processor adapted to:

for one or some of said plurality of tiles, carry out a plurality of correlations;

sum the results of said correlations; and based on the summed results, detect a code characterizing the ranging signal and/or estimate the timing offset of the ranging signal.

DETAILED DESCRIPTION OF PREFERRED EMBODIMENTS

As was previously explained, the receiver accepting the ranging signal is required to detect one out of known transmitted codes x together with its corresponding timing offset $\tau$ over the channel, having a prescribed false alarm rate $P_{FAR}$ and minimal mis-detection probability. The timing offset is assumed to be a non-random but yet unknown parameter. In order to overcome this problem, the log of the likelihood ratio is calculated:

$$\eta(\underline{r}) = \log \frac{\max_{\tau,c} P(\underline{r} | x, \tau, c) P(c)}{P(\underline{r} | 0)} \quad (3)$$

A detection is determined if $\eta(\underline{r}) > \eta_0$, where $\eta_0$ is selected so as to meet the required $P_{FAR}$, and the variable $\tau$ is selected to achieve the maximum value for the time offset.

According to an embodiment of the present invention in a case of a single antenna system, the following method to ranging code detection and ranging offset estimation is provided. As will be shown hereinafter, the method is relatively simple and may provide good approximation to the optimal solution for low SINR ranging code reception.

The method according to this embodiment comprises the following steps:

a. Determine an expected frequency autocorrelation vector of a channel, to be $\underline{R}_{cc}$ b. Determine a set of demodulated per tone measurements $y_k = x_k^H r_k$, given over all tones that are associated with the various ranging code tiles. Over the remaining tones (i.e. the tones not used by the ranging code(s) we may assume $y_k = 0$, but in any case, these remaining tones are not involved in the metric computation.

c. Compute autocorrelation across tiles $y_k$ (typically a tile and its close neighbors according to span of $\underline{R}_{cc}(l)$.

d. Sum up the thus computed autocorrelation over the applicable tiles, to receive the result $\underline{R}_{yy}$. Since $\underline{R}_{yy}$ is conjugate symmetric, it would preferably suffice to compute only one side of the autocorrelation.

e. Multiply the conjugate of autocorrelation $\underline{R}_{yy}$ with a windowing function, $\underline{R}_{cc}$.

f. Use Fast Fourier Transform ("FFT") to correlate the resulting product with multiple exponents having different hypothesized time offsets, and decide according to the resulting following metric:

$$\mu(y) \approx \min_{\tau} \frac{1}{N_0} \sum_{l=-N+1}^{N-1} e^{-j \cdot l \cdot \Delta_w \tau} \cdot \underline{R}_{cc}(l) \cdot \underline{R}_{yy}^*(l) \quad (4)$$

g. If the value of this metric is higher than one or more predetermined thresholds, then detection is determined to be positive and the timing offset τ achieving the minimum value that is associated therewith, is determined to be the timing offset estimate.

This method may also be efficiently combined with beamforming techniques, where the user may carry out spatial beamforming process while also optimizing the delay τ.

Now, let us consider another embodiment by which a method for handling a case where we have a plurality of narrowly spaced antennas array (e.g. antenna spacing half the carrier wavelength) is provided. The number of the antennas is designated hereinafter as $N_a$.

i. Compute windowed autocorrelation, $R_{cc}(l) R_{yy}^{a,b}(l)^H$, for all antenna and all antenna pairs (designating the antennas in each such pair as a and b respectively), and apply a detector as described for example herein in the following steps ii to iv.

$$\mu(y) = \min_\tau \frac{1}{N_0} \sum_{k=1-N_a}^{N_a-1} e^{j\cdot 2\pi \cdot k\Delta \cdot \cos(\theta)} \cdot \left( \sum_{l=-N+1}^{N-1} e^{-j\cdot l\cdot \Delta_w \tau} \cdot R_{cc}(l) \cdot \sum_{a=1}^{N_a} R_{yy}^{a,a-k}(l) \right)^H$$

ii. Sum the autocorrelations thus obtained according to right most summation and apply a $N_a$ FFT's to get a coarse time domain representation thereof (FFT of $N_a$ will suffice in most cases due to k symmetry).

iii. For each candidate delay τ, carry out a maximization procedure to find maximal θ (any appropriate maximization process as known in the art per se may be used). For example, a trivial procedure would be to check several beamforming directions θ according to the array resolution (1/aperture); and iv. Select the combination of (τ, θ) so as to maximize the value of μ(y) and compare the value received with a pre-defined threshold.

Furthermore, the method described above may also be extended for linear non-uniformly spaced arrays using the spatial autocorrelation $R_a$ (i.e. antenna autocorrelation matrix). Let us designate the frequency autocorrelation as $R_f$ and assume that the spatial and the frequency (temporal) autocorrelations are independent. This independence results in the combined autocorrelation being the Kronecker product of spatial and frequency autocorrelation matrixes, that is $$R_c = R_a \otimes R_f$$

In this case the following detector can be used $$\mu(y) = \min_\tau \frac{1}{N_0} \sum_{k=1-N_a}^{N_a-1} e^{j\cdot 2\pi \cdot k\Delta \cdot \cos(\theta)} \cdot \underline{R}_{aa}(k) \cdot \left( \sum_{l=-N+1}^{N-1} e^{-j\cdot l\cdot \Delta_w \tau} \cdot \underline{R}_{ff}(l) \cdot \sum_{a=1}^{N_a} \underline{R}_{yy}^{a,a-k}(l) \right)^H \quad (5)$$

where $\underline{R}_{aa}$ and $\underline{R}_{ff}$ are the vector representations of the autocorrelation matrixes $R_a$ and $R_f$ respectively (this is valid since they are of the Hermitian Toeplitz type). Note that like the temporal detector, it allows reducing complexity when $\underline{R}_{aa}(k)$ becomes small, as k needs not to go up to $N_a$. Furthermore using symmetry of $\underline{R}_{aa}(k)$ and $R_{yy}^{a,a-k}$ with respect to k, allows further reduction in the amount of the required computations.

The following are certain advantages in the method proposed by the present invention.

1. For single antenna complexity (1K FFT) is about half of that which would have been required for carrying out all the processing in the time domain (e.g. using state of the art Radix 4, IFFT and working in time, etc.).

2. At the same time, using an appropriate channel autocorrelation $R_{cc}$ for windowing allows us to get better results with actual channels compared to IFFT and time processing. The results are better both in terms of achieving higher detection probably while experiencing lower rate of false alarms, and also lower timing offset noise.

3. Ranging codes received may effectively be comb-fed with large time separation. By summing the autocorrelations associated with different times, we are in fact agnostic to channel rotation. This can be useful for example for OFDMA periodic channel tracking.

4. For multiple antennas the present invention may either use non-coherent (using single coarse FFT) combining, or beamforming (using $N_a$ coarse FFT's).

5. In addition, the method becomes very efficient while working in a multi stage fashion. That is, first He may use a lower complexity method (e.g. shorter window $\underline{R}_{cc}$ or no beamforming) that allows us to easily discard weak codes. Then we may use higher complexity methods (longer $\underline{R}_{cc}$ and beamforming) in order to make the selection from among stronger codes. Typically, the second stage may rely on most of the computations already made at the first stage, thus the over all (per non-discarded code) computations required will involve just a little more than using the high complexity method already from the beginning of the process. However, for the discarded code, there is significantly less complexity involved without reducing the probability of detection or increasing false alarm and timing offset estimation noise.

The following Figures are used to illustrate the effectiveness of the methods carried in accordance with the present invention.

Figure 1:
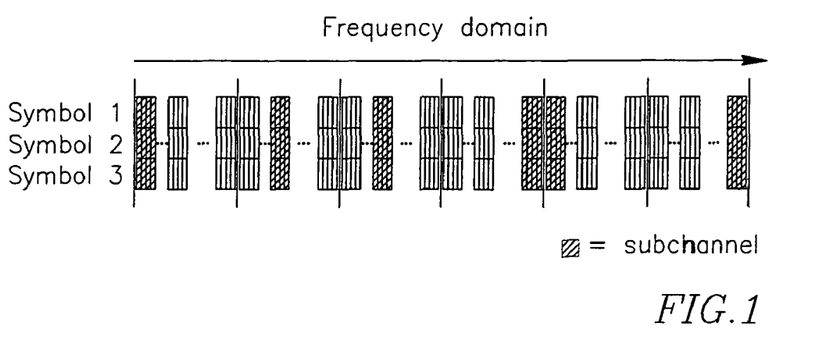
FIG. 1—presents a schematic illustration of a ranging sub-channel, being a subset of tiles for deriving a ranging code.

FIG. 1 illustrates the results obtained while carrying out the method of the present invention for detecting one code out of 4 candidate codes (different correlations), by using Pedestrian B channel, and delay uncertainty 0-25 μs. The curves shown in this Fig. are used to compares the detection performance of the following methods: Curve A Single tile autocorrelation, Curve B—12 tiles autocorrelation (since tiles are sparse, the complexity involved amounts to correlating by only two neighboring tiles on average), Curve C—IFFT followed by square window and Curve D—Two tone autocorrelation.

In the process of carrying out these various methods, one actual ranging code was transmitted, but the attempt was made to detect 4 ranging codes. The X axis of FIG. 1 illustrates the EbN0 (bit energy divided by noise density) while the Y axis—the probability of detecting the wrong code out of the 4 candidate. As may be seen from this graph, while the two tone autocorrelation performs poorly, the single tile and 12 tile autocorrelations out perform the IFFT method.

Figure 2:
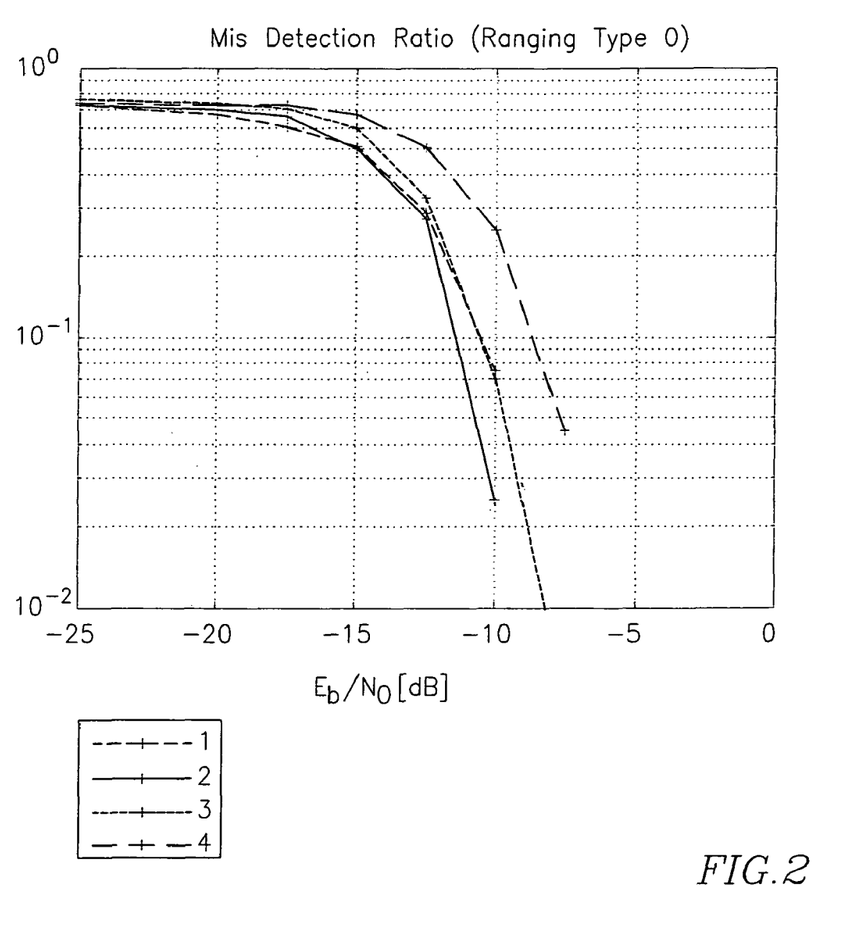
FIG. 2—demonstrates an example of the results obtained by using different methods while detecting one code of 4 candidate Codes (different correlations), using Pedestrian B channel, and delay uncertainty 0-25 μs.

The next figure, FIG. 2, illustrates timing estimation performance using the above methods 1 to 3. The timing estimation error is illustrated while detecting one code of 4 candidate Codes (different correlations), using Pedestrian B channel, and delay uncertainty 0-25 μs.

Again, the X axis illustrate the EbN0 (bit energy divided by noise density) and the Y axis shows in this Fig., the expectation of the absolute timing error. Once again, one may see that the autocorrelation method using length of 12 tiles (i.e. two actual neighbors on average) outperforms the other methods.

Figure 3:
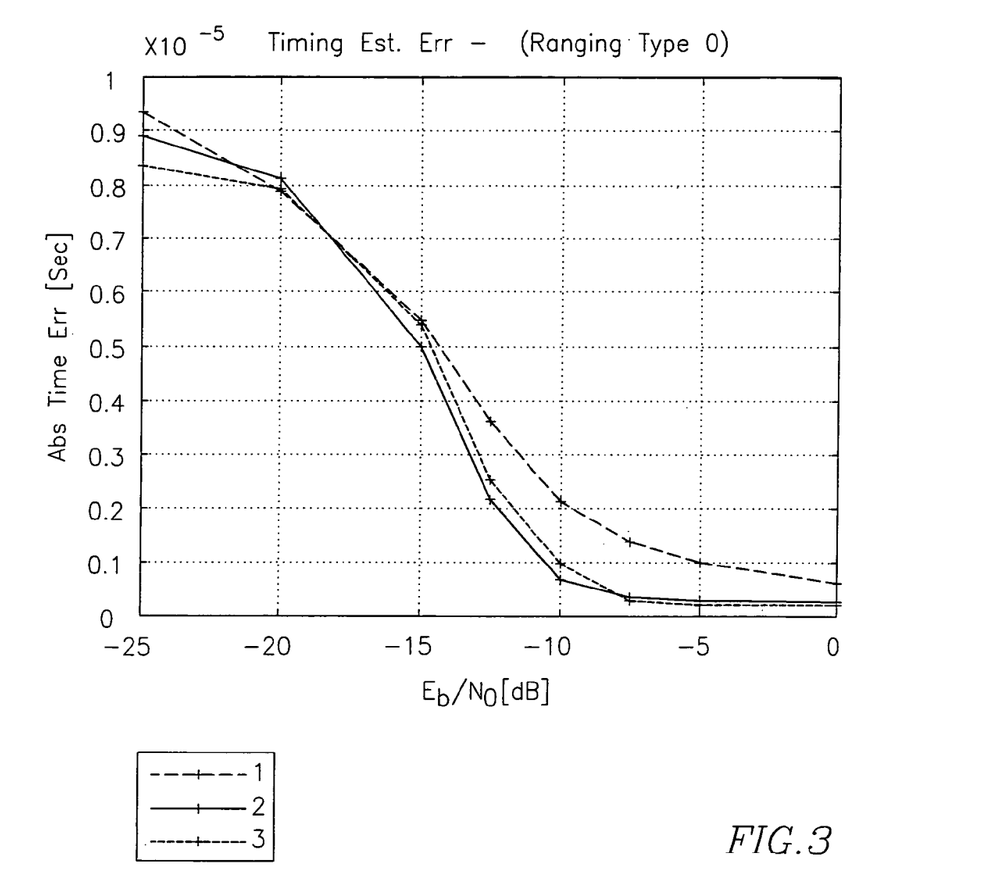
FIG. 3—presents timing estimation error associated with the different detection methods used to obtain FIG. 2.
Figure 4:
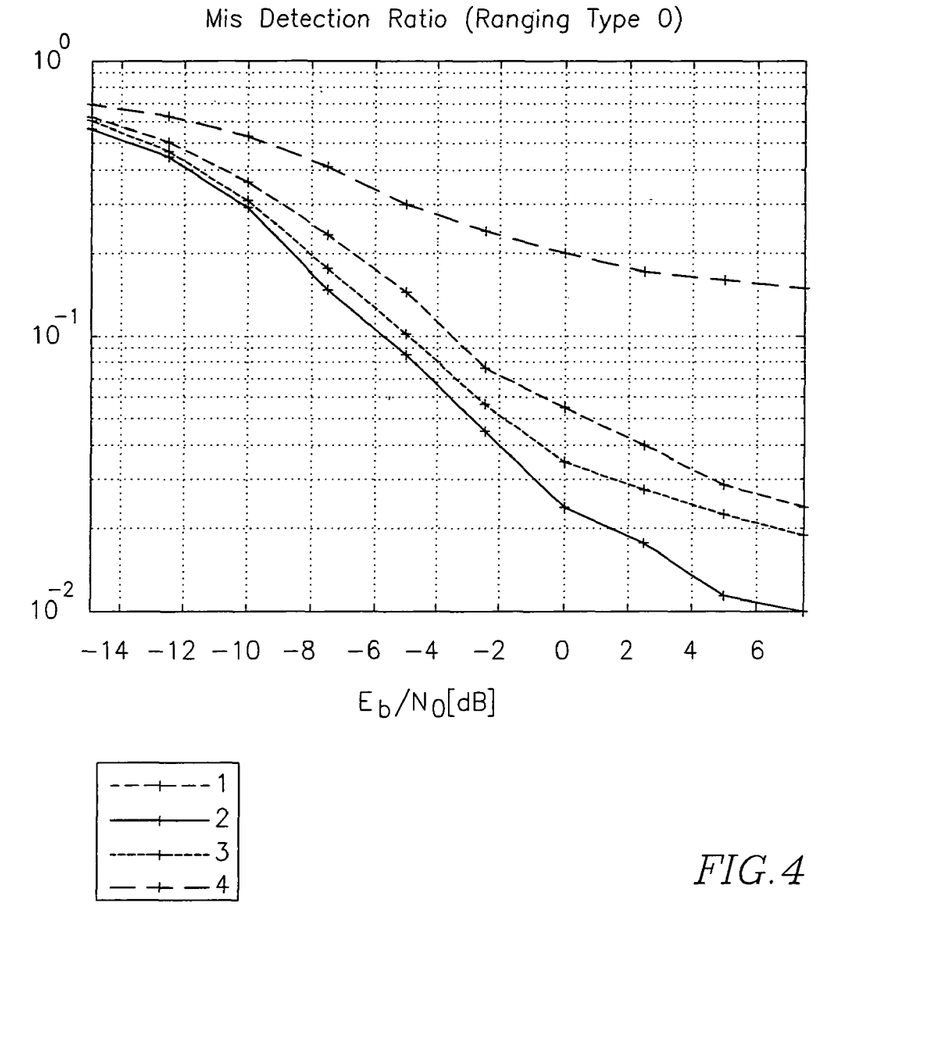
FIG. 4—demonstrates an example of the results obtained by using different methods while detecting 4 codes out of 16 candidate codes, using Pedestrian B channel, and delay uncertainty 0-25 μs.
Figure 5:
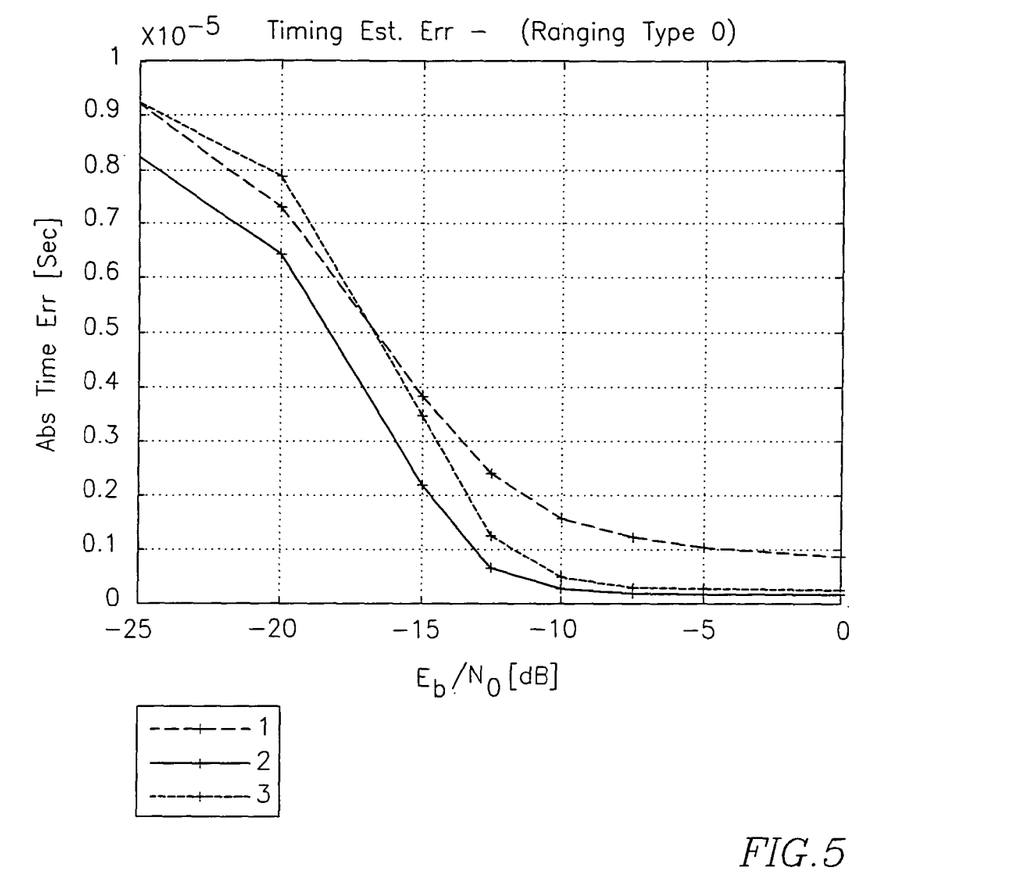
FIG. 5—presents timing estimation error associated with the different detection methods used to obtain FIG. 4.

For the next example, let us consider a case of detecting 4 codes out of 16 candidate codes, using Pedestrian B channel, and delay uncertainty 0-25 μs. In FIG. 3, a comparison is shown demonstrating the detection performance using each of the following methods:

Curve A—Single tile autocorrelation
Curve B—12 tiles autocorrelation (since tiles are sparse, the complexity involved amounts to correlating by only two neighboring tiles on average),
Curve C—IFFT; and
Curve D—Two tone autocorrelation All these methods were carried out by transmitting four actual ranging codes, and trying at the receiving side to detect 16 ranging codes. FIG. 3 shows the probability of detecting the wrong codes out of the 16 candidate (Y axis) as a function of EbN0 (bit energy divided by noise density) plotted at the X axis. As may be seen from this Fig., while the two tone autocorrelation performs poorly, the 12 tile autocorrelations out performs the IFFT method. Similarly for the following timing error figure, one may see that the autocorrelation methods using length of 12 tiles outperform other methods.

In order to further estimate the complexity of the various methods, the following Table 1 presents a comparison of the estimated complexity using TI C64+ DSP (Himalaya) operating at 1 GHz:

TABLE 1

| Method | Total No. of cycles per code | Run Time | Remarks |
|---|---|---|---|
| Single tile autocorrelation | 1000 | 16 μs | 10 Time Hyp |
| IFFT followed by square window | 4500 | 75 μs | 16 Codes (1K FFT) |
| 12 tiles long autocorrelation | 2500 | 40 μs | 16 Codes (256 FFT) |

As may be seen from this table, both autocorrelation methods have lower complexity then the time domain processing method (IFFT).

Let us now consider a number of examples demonstrating how the present invention may be applied to various cases:

EXAMPLE 1

Single Antenna Solution

According to the assumptions made in the previous section (note that the timing offset is implicit in $\underline{X}$), $$P(\underline{r} \mid \underline{X}, \underline{c}) = \frac{1}{N_0^N \pi^N} \exp\left(-\frac{1}{N_0} \|r - Xc\|^2\right) \qquad (6)$$

Since $R_c$ is an autocorrelation matrix which has to be positive definite, we may replace c by $$\underline{c} = R_c^{1/2} \underline{\xi} \qquad (7)$$

where $\underline{\xi}$ is a vector of independent complex Gaussian normalized (i.e. variance of each is 1) random variables (note $E(\underline{c} \cdot \underline{c}^H) = E(R_c^{1/2} \underline{\xi} \underline{\xi}^H R_c^{H/2}) = R_c^{1/2} R_c^{H/2} = R_c$)

$$P(\underline{\xi}) = \frac{1}{\pi^N} \exp(-\underline{\xi}^H \underline{\xi}). \qquad (8)$$

We assume that $R_c$ is perfectly known.
From equations (6)-(8) we can derive that $$\max_{\tau, \xi} P(\underline{r} \mid \underline{x}, \tau, \underline{c}) P(\underline{c}) = \qquad (9)$$

$$\max_{\tau, \xi} \frac{1}{N_0^N \pi^N} \exp\left(-\frac{1}{N_0} \|r - X R_c^{1/2} \underline{\xi}\|^2\right) \cdot \frac{1}{\pi^N} \exp(-\underline{\xi}^H \underline{\xi})$$

Finally $$\eta(r) = \log \frac{\max_{\tau, \xi} \frac{1}{N_0^N \pi^N} \exp\left(-\frac{1}{N_0} \|r - X R_c^{1/2} \underline{\xi}\|^2\right) \cdot \frac{1}{\pi^N} \exp(-\underline{\xi}^H \underline{\xi})}{\frac{1}{N_0^N \pi^N} \exp\left(-\frac{1}{N_0} \|r\|^2\right)} \qquad (10)$$

Thus the decision may be made in accordance with the following sufficient statistic $$\mu(r) = \min_{\tau, \xi} \left( \|r - X R_c^{1/2} \underline{\xi}\|^2 + N_0(\underline{\xi}^H \underline{\xi}) - \|r\|^2 \right) \qquad (11)$$

where a code is detected when $\mu(r) < \mu_0$, for some threshold $\mu_0$ chosen to meet the required $P_{FAR}$. The corresponding maximization argument $\tau$ is then used as the timing offset. Note $\underline{X}$ is defined above as a function of $\tau$.

The above condition (11) can be somewhat simplified by assuming equal magnitude symbols, $|x_k|=1$ and by defining:

$$\underline{y} = \underline{X}^H \underline{r} \qquad (12)$$

The operation used in (12) can be considered as the removal of the modulation (demodulation), in which case (11) will now become:

$$\mu(y) = \min_{\tau, \xi} \left( \|y - \underline{D}(\tau) \cdot R_c^{1/2} \underline{\xi}\|^2 + N_0(\underline{\xi}^H \underline{\xi}) - \|y\|^2 \right) \qquad (13)$$

where $\underline{D}(\tau) = \text{diag}([I_1 e^{-j \cdot 0 \Delta_w \tau} I_2 e^{-j \cdot 1 \Delta_w \tau} \ldots I_k e^{-j \cdot (k-1) \Delta_w \tau} \ldots I_N e^{-j \cdot (N-1) \Delta_w \tau}])$ and $I_k$ are indicator Boolean constants $I_K \equiv (x_k \neq 0)$. That is, $I_k$ is zero only if $x_k$ is also zero, otherwise $I_k$ is equal to 1.

For the next step, let us simplify (13)

$$\mu(y) = \min_{\tau, \xi} \left( (y - \underline{D}(\tau) \cdot R_c^{1/2} \underline{\xi})^H (y - \underline{D}(\tau) \cdot R_c^{1/2} \underline{\xi}) + N_0(\underline{\xi}^H \underline{\xi}) - \|y\|^2 \right) \qquad (14)$$

$$= \min_{\tau, \xi} \left( -2 \text{Re}(y^H \underline{D}(\tau) \cdot R_c^{1/2} \underline{\xi}) + \underline{\xi}^H (R_c^{H/2} \|\underline{D}(\tau)\|^2 R_c^{1/2} + N_0 \cdot I) \underline{\xi} \right)$$

where $I$ is the identity matrix.
Now, let us now denote:

$$\underline{b} = y^H \underline{D}(\tau) \cdot R_c^{1/2}$$

$$V \Lambda V^H = R_c^{H/2} \|\underline{D}(\tau)\|^2 R_c^{1/2} + N_0 \underline{I} \qquad (15)$$

where, the last line assumes the existence of a unitary diagonalization, which can be easily verified.

Thus $$\mu(r) = \min_{\tau,\underline{\xi}}(-2\text{Re}(\underline{b}\cdot\underline{\xi}) + \underline{\xi}^H \underline{V}\Lambda\underline{V}^H\underline{\xi}) \quad (16)$$

and upon defining $$\underline{\zeta} = \Lambda^{1/2}\underline{V}^H\underline{\xi} \quad (17)$$

we get $$\mu(r) = \min_{\tau,\underline{\zeta}}(-2\text{Re}(\underline{b}\cdot\underline{V}\Lambda^{-1/2}\underline{\zeta}) + \underline{\zeta}^H\underline{\zeta}) \quad (18)$$

For a given norm $\|\underline{\zeta}\|^2 = \gamma^2$ we better maximize the Re() thus $$\underline{\zeta} = \frac{\Lambda^{-H/2}\underline{V}^H\underline{b}}{\|\underline{b}\cdot\underline{V}\Lambda^{-1/2}\|}\gamma,$$

thus we get (The Re() argument is real)

$$\mu(r) = \min_{\tau,\gamma}\left(-2\left(\underline{b}\cdot\underline{V}\Lambda^{-1/2}\frac{\Lambda^{-H/2}\underline{V}^H\underline{b}^H}{\|\underline{b}\cdot\underline{V}\Lambda^{-1/2}\|}\gamma\right) + \gamma^2\right) \quad (19)$$

$$= \min_{\tau,\underline{\zeta}}\left(-2\left(\frac{\underline{b}\cdot\underline{V}\Lambda^{-1}\underline{V}^H\underline{b}^H}{\|\underline{b}\cdot\underline{V}\Lambda^{-1/2}\|}\right) + \gamma\right)\cdot\gamma = \gamma_{min}^2 = \underline{b}\cdot\underline{V}\Lambda^{-1}\underline{V}^H\underline{b}^H \quad (20)$$

Since $$\gamma_{min} = \left(\frac{\underline{b}\cdot\underline{V}\Lambda^{-1}\underline{V}^H\underline{b}^H}{\|\underline{b}\cdot\underline{V}\Lambda^{-1/2}\|}\right) = \|\underline{b}\cdot\underline{V}\Lambda^{-1/2}\| \quad (21)$$

Upon assigning back (15) one would get $$\mu(r) = \min_{\tau} y^H \underline{D}(\tau)\cdot R_c^{1/2}\cdot(R_c^{H/2}\|\underline{D}(\tau)\|^2 R_c^{1/2} + N_0\cdot I)^{-1} R_c^{H/2}\underline{D}(\tau)^H y$$

and when solving for $\underline{\xi}$, we get $$\mu(y) = \min_{\tau} y^H \underline{D}(\tau)\cdot R_c^{1/2}\cdot(R_c^{H/2}\|\underline{D}(\tau)\|^2 R_c^{1/2} + N_0\cdot I)^{-1} R_c^{H/2}\underline{D}(\tau)^H y \quad (22)$$

For small received ranging signal (which is the interesting case) we may neglect $R_c^{H/2}\|\underline{D}(\tau)\|^2 R_c^{1/2}$ as it is significantly smaller than $N_0\cdot\underline{I}$, thus $$\mu(y) \approx \min_{\tau} \frac{1}{N_0} y^H \underline{D}(\tau)\cdot R_c\underline{D}(\tau)^H y \quad (23)$$

$$= \min_{\tau} \frac{1}{N_0}\text{trace}(y^H \underline{D}(\tau)\cdot R_c\underline{D}(\tau)^H y) \quad (24)$$

$$= \min_{\tau} \frac{1}{N_0}\text{trace}(\underline{D}(\tau)\cdot R_c\underline{D}(\tau)^H y\cdot y^H)$$

By using $$(\underline{D}(\tau)\cdot \underline{R}_c\underline{D}(\tau)^H)_{m,n} = I_m e^{-j\cdot m\Delta_w\tau}\cdot\underline{R}_{cc}(m-n)\cdot I_n e^{+j\cdot n\Delta_w\tau} \quad (25)$$

we get $$\sum_{m=1}^{N}\sum_{k=1}^{N}(\underline{D}(\tau)\cdot R_c\underline{D}(\tau)^H)_{m,k}\cdot y_k y_m^* = \quad (26)$$

$$\sum_{m=1}^{N}\sum_{k=1}^{N}I_m e^{-j\cdot m\Delta_w\tau}\cdot\underline{R}_{cc}(m-k)\cdot I_k e^{+j\cdot k\Delta_w\tau}\cdot y_k y_m^*$$

By summation index substitution $l \equiv m-k$, and defining $I_m$ and $y_m$ when being out of range $(1, 2, \ldots, N)$ as zero $$= \sum_{m=1}^{N}\sum_{l=-N+1}^{N-1} e^{-j\cdot l\Delta_w\tau}\cdot\underline{R}_{cc}(l)\cdot I_m I_{m-l}\cdot y_{m-l}y_m^* \quad (27)$$

we would get $$= \sum_{l=-N+1}^{N-1} e^{-j\cdot l\Delta_w\tau}\cdot\underline{R}_{cc}(l)\cdot\sum_{m=1}^{N} I_{m-l}y_{m-l}\cdot I_m y_m^* \quad (28)$$

Defining $\underline{R}_{yy}$ as $$\underline{R}_{yy}(l) = \sum_{m=1}^{N} I_m y_m\cdot I_{m-l}y_{m-l}^* \quad (29)$$

We would get the final form of $$\mu(y) \approx \min_{\tau} \frac{1}{N_0}\sum_{l=-N+1}^{N-1} e^{-j\cdot l\Delta_w\tau}\cdot\underline{R}_{cc}(l)\cdot\underline{R}_{yy}^*(l) \quad (30)$$

Since $\underline{R}_{cc}(l)$ typically becomes small for large l, we may ignore large l's altogether. Therefore we need only a truncated frequency autocorrelation $\underline{R}_{yy}^*(l)$, which may be quite fast to compute. Given that the truncated autocorrelation $\underline{R}_{yy}^*(l)$ is short, we need to correlate each tile only with its close neighbors (e.g. 1 or 2 adjacent tiles), thus, reducing substantially the overall processing required.

Furthermore (30) is actually an FFT of the windowed and truncated frequency auto correlation and thus may be performed quickly. Moreover, since multiplication by $\underline{R}_{cc}(l)$ in frequency domain effectively filters the output in time domain, the set of $\tau$ values that we need to check, becomes small (coarse $\tau$ sampling would suffice). Consequently, small FFT should be adequate.

In view of the above, one embodiment of the present invention provides the following method for the processing procedure 1. Designating a frequency autocorrelation of the channel as $\underline{R}_{cc}$
2. Designating a set of demodulated per tone measurements $y_k = x_k^H r_k$, given over all tones belonging to the ranging code tiles. Over other tones not used by the ranging code, we assume that $y_k = 0$, but these need not be involved in the metric computation.
3. Computing auto correlation across tiles $y_k$ (typically a tile and its close neighbors according to span of $\underline{R}_{cc}(l)$.

4. Summing up this autocorrelation over all tiles, to receive the resulting $R_{yy}$. Since $R_{yy}$ has conjugate symmetry, it would preferably suffice to compute one side only.
5. Multiplying the conjugate of autocorrelation $R_{yy}$ with the windowing function $R_{cc}$
6. Using FFT to correlate the resulting product with multiple exponents having different hypothesized time offsets, to determine the resulting following metric $$\mu(y) \approx \min_{\tau} \frac{1}{N_0} \sum_{l=-N+1}^{N-1} e^{-j \cdot l \cdot \Delta_w \tau} \cdot \underline{R}_{cc}(l) \cdot \underline{R}_{yy}^*(l)$$

7. If this metric is higher than some predetermined threshold, then detection is considered to be positive and the timing offset $\tau$ for achieving the minimum value, is considered to be the timing offset estimate.

EXAMPLE 2

Beamforming Solution

The single antenna solution described above has coherent phasing only in time domain. However in case of multiple antennas we may still further improve the situation. We may carry out beamforming (spatial phasing) and coherent combination based on timing offset at the same time. In order not to lose the signal power in the beamforming process, we need to assume that the ranging transmission angle spread is small with respect to array beamwidth. Consequently, when looking at the CPE direction, we shall not lose transmit power (due to paths that are out of the beam formed main lobe). For a macro cell, due to the low angle spread (e.g. 5 degrees), this will be true for narrow arrays.

By considering pairs of the best delay and the best direction, we obtain the coherent beam forming gain. When assuming $N_a$ antennas, then with respect to the single antenna case we may gain an addition of $10*\log(N_a)$ [dB].

To derive the beamforming solution we may first beamform using a set of antenna weights $\{w_a\}_{a=1}^{N_a}$, and then carry out a coherent phasing in time according to a delay $\tau$. Although we need to optimize the delay and antenna weights together, in the following discussion we assume that we already have the weight set $d=\{w_a\}_{a=1}^{N_a}$. Now we can apply the single antenna solution in the direction corresponding to weight set $d=\{w_a\}_{a=1}^{N_a}$.

First, we need to compute the frequency auto correlation in the direction $d=\{w_a\}_{a=1}^{N_a}$. In order to omit $I_k$ we assume the $y_k$ are zeroed outside the ranging code tiles, and do not participate in the computation.

$$\underline{R}_{yy}^d(l) = \sum_{k=1}^{N} \left( \sum_{a=1}^{N_a} y_k^a \cdot w_a \right) \left( \sum_{a=1}^{N_a} y_{k-l}^a \cdot w_a \right)^H =$$

$$= \sum_{a=1}^{N_a} \sum_{b=1}^{N_a} w_a w_b^H \cdot \sum_{k=1}^{N} \left( y_k^a \cdot (y_{k-l}^b)^H \right)$$

Thus defining the antenna cross correlation as:

$$R_{yy}^{a,b}(l) = \sum_{k=1}^{N} y_k^a (y_{k-l}^b)^H$$

where a and b are the antenna indexes and l is the frequency offset in tones.
We now get $$\underline{R}_{yy}^d(l) = \sum_{a=1}^{N_a} \sum_{b=1}^{N_a} w_a w_b^H \cdot R_{yy}^{a,b}(l)$$

Combining the above with equation (30) we get the complete solution:

$$\mu(y) \approx \min_{\tau} \frac{1}{N_0} \sum_{l=-N+1}^{N-1} e^{-j \cdot l \cdot \Delta_w \tau} \cdot \sum_{a=1}^{N_a} \sum_{b=1}^{N_a} w_a^H w_b \cdot \underline{R}_{cc}(l) \cdot \underline{R}_{yy}^{a,b}(l)^H \quad (31)$$

Assuming a narrow uniformly spaced linear array ("ULA"), the weight vector will have a typical form $$w_a = e^{-j \cdot 2\pi \cdot a \Delta \cdot \cos(\theta)} \quad (32)$$

where:
$\Delta$—is the ULA array spacing in wavelengths; and
$\theta$—is the angle of arrival with respect to the broadside.
Therefore $$\mu(y) \approx \quad (33)$$

$$\min_{\tau} \frac{1}{N_0} \sum_{a=1}^{N_a} \sum_{b=1}^{N_a} e^{j \cdot 2\pi \cdot (a-b) \Delta \cdot \cos(\theta)} \cdot \left( \sum_{l=-N+1}^{N-1} e^{-j \cdot l \cdot \Delta_w \tau} \cdot \underline{R}_{cc}(l) \cdot \underline{R}_{yy}^{a,b}(l)^H \right)$$

Changing summations $$= \min_{\tau} \frac{1}{N_0} \sum_{a=1}^{N_a} \sum_{k=1-N_a}^{N_a-1} e^{j \cdot 2\pi \cdot k \Delta \cdot \cos(\theta)} \cdot \left( \sum_{l=-N+1}^{N-1} e^{-j \cdot l \cdot \Delta_w \tau} \cdot \underline{R}_{cc}(l) \cdot \underline{R}_{yy}^{a,a-k}(l)^H \right) \quad (34)$$

$$= \min_{\tau} \frac{1}{N_0} \quad (35)$$

$$\sum_{k=1-N_a}^{N_a-1} e^{j \cdot 2\pi \cdot k \Delta \cdot \cos(\theta)} \cdot \left( \sum_{l=-N+1}^{N-1} e^{-j \cdot l \cdot \Delta_w \tau} \cdot \underline{R}_{cc}(l) \cdot \sum_{a=1}^{N_a} \underline{R}_{yy}^{a,a-k}(l)^H \right)$$

In view of the above and in accordance with another embodiment of the invention, there is provided the following processing method:
1. Computing windowed truncated auto correlation, $R_{cc}(l) \cdot R_{yy}^{a,b}(l)^H$, for all antennas and all antenna pairs;
2. Summing them together according to (35) inner summation, then using $N_a$ FFT's to get a coarse time domain representation thereof ($N_a$ FFT's suffice due to k symmetry);
3. For each candidate delay $\tau$, carrying out any maximization procedure known in the art per se to find maximal $\theta$.

An example of a trivial procedure is to check several beamforming directions θ according to array resolution (1/aperture);

4. Selecting the combination of (τ, θ) so as to maximize μ(y) and compare the result to a pre-defined threshold.

EXAMPLE 3

Non Coherent Combining Solution

In case we have several antennas, and we do not want to use beamforming, the following procedure may be carried out. For each antenna we compute the autocorrelation of its tiles, and sum all of them together. Then we may proceed by repeating steps 5 to 7 that are provided in the method described under Example 1, the single antenna solution.

Similarly if we have received several ranging codes, at different—substantially separated—times, we may also proceed by autocorrelation summing. More specifically, for each ranging code we compute the auto correlation among its tiles. Then we sum the auto correlations received at different times. From the fact that we sum autocorrelations it is clear that we are agnostic to phase rotation (due to time separation), hence there is no need to compensate for channel rotation over time.

It should be noted that for subsequent symbols (small time separation) with sufficiently low Doppler, we may assume the channel has rotated insignificantly. In this case it would be better to coherently sum the subsequent ranging symbols, since coherent combining gain is achieved.

EXAMPLE 4

Partial Coherent and Partial Non Coherent Combining

Depending on the array structure, the beamforming (i.e. space coherent combining) and non coherent modes may be combined. By assuming that space and frequency correlations are independent, i.e.

$$E(c_{a1,f1} \cdot c_{a2,f2}^H) = E(c_{f1} \cdot c_{f2}^H) E(c_{a1} \cdot c_{a2}^H) = R_{ff}(f1-f2) \cdot R_{aa}(a1-a2) \quad (36)$$

Thus, the frequency and space correlation may be separated to the product of a frequency only correlation $R_{ff}(f1-f2)$ and space only correlation $R_{aa}(a1-a2)$ (where the frequency and space correlations are in a vector format). In this case we may also express $R_c$ as the following Kronecker product:

$$R_c = R_a \otimes R_f \quad (37)$$

where the channel ($R_c$), space ($R_a$) and frequency ($R_f$) correlations are in a matrix format. Using a similar derivation as for the single antenna case, we get the following:

Denoting $$\underline{D} = \underline{D}_a(\theta) \otimes \underline{D}_f(\tau) \quad (38)$$

Using the assumption in (36) and notation of (37)

$$\mu(y) \approx \min_\tau \frac{1}{N_0} y^H \underline{D} \cdot (R_a \otimes R_f) \underline{D}^H y \quad (39)$$

$$= \min_\tau \frac{1}{N_0} y^H (\underline{D}_a(\theta) \otimes \underline{D}_f(\tau)) \cdot (R_a \otimes R_f) \cdot (\underline{D}_a(\theta) \otimes \underline{D}_f(\tau))^H y \quad (40)$$

$$= \min_\tau \frac{1}{N_0} y^H (\underline{D}_a(\theta) R_a \underline{D}_a(\theta)^H \otimes \underline{D}_f(\tau) R_f \underline{D}_f(\tau)^H) y \quad (41)$$

$$= \min_\tau \frac{1}{N_0} y^H [(\underline{D}_a(\theta) R_a \underline{D}_a(\theta)^H)_{m,n} (\underline{D}_f(\tau) R_f \underline{D}_f(\tau)^H)]_{m,n=1,\ldots,N_a} y \quad (42)$$

$$\mu(y) \approx \min_\tau \frac{1}{N_0} \sum_{m=1}^{N_a} \sum_{n=1}^{N_a} (\underline{D}_a^{m,m}(\theta) R_a(m,n) \underline{D}_a^{n,n}(\theta)^H) y_m^H (\underline{D}_f(\tau) R_f \underline{D}_f(\tau)^H) y_n \quad (43)$$

$$\min_\tau \frac{1}{N_0} \sum_{m=1}^{N_a} \sum_{n=1}^{N_a} (e^{j2\pi \cdot m\Delta \cdot \cos(\theta)} R_{aa}(m-n) e^{-j2\pi \cdot n\Delta \cdot \cos(\theta)})_{m,n} \left( \sum_{l=-N+1}^{N-1} e^{-j \cdot l \cdot \Delta_w \tau} \cdot \underline{R}_{ff}(l) \cdot (\underline{R}_{yy}^{m,n}(l))^H \right) \quad (44)$$

By summation index substitution k=m−n, and defining $R_{yy}^{m,n}$ when out of range (m, n=1, 2, . . . , $N_a$) as zero, we get $$\min_\tau \frac{1}{N_0} \sum_{m=1}^{N_a} \sum_{k=-N_a+1}^{N_a-1} e^{j2\pi \cdot k\Delta \cdot \cos(\theta)} \quad (45)$$

$$R_{aa}(k) \left( \sum_{l=-N+1}^{N-1} e^{-j \cdot l \cdot \Delta_w \tau} \cdot \underline{R}_{ff}(l) \cdot (\underline{R}_{yy}^{m,m-k}(l))^H \right)$$

$$\min_\tau \frac{1}{N_0} \quad (46)$$

$$\sum_{k=-N_a+1}^{N_a-1} e^{j2\pi \cdot k\Delta \cdot \cos(\theta)} R_{aa}(k) \sum_{l=-N+1}^{N-1} e^{-j \cdot l \cdot \Delta_w \tau} \cdot \underline{R}_{ff}(l) \cdot \sum_{m=1}^{N_a} (\underline{R}_{yy}^{m,m-k}(l))^H$$

Given the above, we may derive the following metric:

$$\mu(y) = \min_\tau \frac{1}{N_0} \sum_{k=1-N_a}^{N_a-1} e^{j \cdot 2\pi \cdot k\Delta \cdot \cos(\theta)} \cdot \quad (47)$$

$$\underline{R}_{aa}(k) \cdot \left( \sum_{l=-N+1}^{N-1} e^{-j \cdot l \cdot \Delta_w \tau} \cdot \underline{R}_{ff}(l) \cdot \sum_{a=1}^{N_a} \underline{R}_{yy}^{a,a-k}(l)^H \right)$$

As in the single antenna case, we may ignore k as $R_{aa}(a1-a2)$ is rather small, thus considering only a small range for k. For example assume we have a linear array with 4 antennas A1, A2, A3, A4 and the following antenna spacing 0.5*λ, 10*λ and 0.5*λ (where λ is the signal wavelength). Assuming that the pair A1, A2 is far away from the pair A3, A4 for the correlation to be significant we may use the following metric:

$$\mu(y) = \min_{\tau} \frac{1}{N_0} \sum_{k=-1}^{1} e^{j \cdot 2\pi \cdot k \Delta \cdot \cos(\theta)} \cdot \underline{R}_{aa}(k) \cdot \left( \sum_{l=-N+1}^{N-1} e^{-j \cdot l \cdot \Delta_w \tau} \cdot \underline{R}_{ff}(l) \cdot \sum_{a=1}^{N_a} \underline{R}_{yy}^{a,a-k}(l)^H \right) \quad (48)$$

Here we effectively combine beamforming for close antennas and non-coherent combining for far antennas. In addition, we use coherent combining for close tones, while non-coherent combining for far tones.

EXAMPLE 5

Multi Code Incremental Detection

The scheme described in this Example, may be used to allow efficient multistage detection. At the first stage we use a low complexity method to reduce the computation load, but in order not to miss detections we use a low threshold. This obviously leads to detecting substantially more codes than expected, which amounts to having a high false alarm rate. At the second stage, this false alarm rate is subsequently reduced by using more robust detectors—which also lead to having higher complexity. Nevertheless, the second stage is run on substantially less hypothesis than the first stage. In other words, applying the more complex detectors only at the second stage does help to reduce the computation load. This is especially efficient as most computation required for the first stage is contained in the second.

It is to be understood that the above description only includes some embodiments of the invention and serves for its illustration. Numerous other ways of improving the estimation of pilot sequences in telecommunication networks may be devised by a person skilled in the art without departing from the scope of the invention, and are thus encompassed by the present invention.

The invention claimed is:

1. In a wireless communications network, a method for detecting and/or estimating a ranging signal, said method comprising:
    at least one subscriber station transmitting said ranging signal to a base station in a wireless Orthogonal Frequency Division Multiple Access (OFDMA) communications network, said ranging signal comprising a plurality of tiles,
    for two or more of said plurality of tiles, said base station performing a plurality of multiplications between subscribers, wherein at least one of said plurality of multiplications is performed between non-adjacent subcarriers associated with one of said two or more of said plurality of tiles;
    at said base station, summing the results of said plurality of multiplications, thereby obtaining mathematical correlations that comprise summed results; and
    at said base station, detecting a code characterizing said ranging signal and/or estimating the timing offset of said ranging signal, based on the summed results.

2. The method according to claim 1, wherein at least some of said mathematical correlations are correlations performed for respective tiles out of said plurality of tiles, with a pre-determined number of their respective neighboring tiles.

3. The method according to claim 2, wherein said predetermined number of the neighboring tiles is 1,2 or 3.

4. The method according to claim 1, further comprising determining a pre-defined value for maximum allowable frequency offset, and performing correlations for any given tile with as many neighboring tiles as there are within said maximum allowable frequency offset.

5. The method according to claim 1, wherein at least some of said mathematical correlations are short autocorrelations of respective tiles out of said plurality of tiles for use in determining weak hypothesis to be discarded and wherein longer autocorrelations are performed for the remaining hypothesis for final detection.

6. The method according to claim 1, further comprising multiplying said mathematical correlations with a corresponding frequency domain window and applying code detection and ranging estimation on the resulting multiplication product.

7. The method according to claim 1, where said estimating further comprises correlating said mathematical correlations with an exponent that is associated with delay hypothesis.

8. The method according to claim 1, wherein said estimating further comprises using a coarse IFFT to estimate said timing offset.

9. The method according to claim 1, wherein said mathematical correlations are autocorrelations performed across two adjacent tiles of said two or more of said plurality of tiles.

10. The method according to claim 1, wherein said mathematical correlations are performed for a plurality of correlation vectors.

11. The method according to claim 1, wherein said performing a plurality of multiplications between subcarriers comprises performing at least one of said mathematical correlations on said non-adjacent subcarriers associated with said one of said two or more of said plurality of tiles and performing at least another one of said mathematical correlations on subcarriers belonging to different tiles.

12. A wireless receiver for detecting and/or estimating a ranging signal, said receiver comprising:
    an interface configured to receive wireless transmission comprising said ranging signal that comprises a plurality of tiles from at least one wireless transmitter in a wireless Orthogonal Frequency Division Multiple Access (OFDMA) communications network;
    at least one processor configured to:
    performing, for two or more of said plurality of tiles, a plurality of multiplications between subcarriers, wherein at least one of said plurality of multiplications is performed between non-adjacent subcarriers associated with one of said two or more of said plurality of tiles; and
    summing the results of said multiplications, thereby obtaining mathematical correlations that comprise summed results; and
    detecting a code characterizing said ranging signal and/or estimate the timing offset of said ranging signal, based on the summed results.

13. The receiver according to claim 12, wherein at least some of said mathematical correlations are correlations of respective tiles out of said plurality of tiles with a pre-determined number of their respective neighboring tiles.

14. The receiver according to claim 12, wherein said at least one processor is configured to perform short autocorrelations of at least some of respective tiles out of said plurality of tiles for discarding weak hypothesis and wherein said at least one processor is further configured to perform longer autocorrelations for the remaining hypothesis.

15. The receiver according to claim 14, wherein said at least one processor is further configured to multiply at least some of said mathematical correlations with corresponding windows characterized by power delay profiles associated therewith and said receiver further comprises a detector configured to operate at one or more of said windows, in order to determine said ranging signal.

16. The receiver according to claim 15, wherein said at least one processor is configured to multiply at least some of said mathematical correlations with more than one window, each window characterized by a different pre-defined power delay profile.

17. The receiver according to claim 12, wherein said at least one processor is configured to perform said plurality of multiplications between subcarriers by performing said at least one of said mathematical correlations on said non-adjacent subcarriers associated with said one of said two or more of said plurality of tiles and performing at least another one of said mathematical correlations on subcarriers belonging to different tiles.

* * * * *